United States Patent [19]
Nishikawa et al.

[11] Patent Number: 5,596,141
[45] Date of Patent: Jan. 21, 1997

[54] TIRE RESONANCE FREQUENCY DETECTING SYSTEM HAVING INTER-WHEEL NOISE ELIMINATION AND METHOD FOR THE SAME

[75] Inventors: Yoshihiro Nishikawa; Ikuo Hayashi, both of Okazaki; Takeyasu Taguti, Oobu, all of Japan

[73] Assignee: Nippondenso Co., Ltd., Kariya, Japan

[21] Appl. No.: 510,677

[22] Filed: Aug. 3, 1995

[30] Foreign Application Priority Data

Aug. 4, 1994 [JP] Japan ..................... 6-183430

[51] Int. Cl.$^6$ ..................... B60C 23/00; B60C 23/02
[52] U.S. Cl. ..................... 73/146.2; 340/448
[58] Field of Search ..................... 73/146.3, 146.5, 73/146.8, 146.2; 340/445, 448; 364/572, 574, 724.01, 724.18

[56] References Cited

U.S. PATENT DOCUMENTS

| | | | |
|---|---|---|---|
| 4,574,267 | 3/1986 | Jones | 73/146.2 |
| 4,630,470 | 12/1986 | Brooke et al. | 73/146.2 |
| 4,907,452 | 3/1990 | Yopp | 73/457 |
| 5,392,213 | 2/1995 | Houston et al. | 364/421 |

FOREIGN PATENT DOCUMENTS

| | | |
|---|---|---|
| 421065 | 4/1991 | European Pat. Off. . |
| 578826 | 1/1994 | European Pat. Off. . |
| 0578826A1 | 1/1994 | European Pat. Off. ............ 73/146.2 |
| 636503 | 2/1995 | European Pat. Off. . |
| 62-149503 | 7/1987 | Japan . |
| 5133831 | 5/1993 | Japan . |
| 5221208 | 8/1993 | Japan . |
| 5294118 | 11/1993 | Japan . |
| 405319041 | 12/1993 | Japan ............................. 73/146.5 |
| 40531903 | 12/1993 | Japan ............................. 73/146.5 |
| 8808593 | 11/1988 | WIPO . |
| 9114586 | 10/1991 | WIPO . |

OTHER PUBLICATIONS

U.S. Patent Application No. 08/168,093 filed Dec. 12, 1993; "Tire Air Pressure Detecting Device"; Naito et al., inventors Dec. 1993.

*Primary Examiner*—Richard Chilcot
*Assistant Examiner*—Paul D. Amrozowicz
*Attorney, Agent, or Firm*—Cushman, Darby & Cushman

[57] ABSTRACT

Tire vibration frequency components of left-hand and right-hand tires are derived from wheel speed signals while a vehicle is traveling. A noise frequency component is detected based on a correlation between the vibration frequency components of the left-hand and right-hand tires, and the noise frequency component is reduced relative to the vibration frequency component. Thereafter, resonance frequencies of each tire are detected using the vibration frequency component from which the noise frequency component is reduced, and tire air pressures are detected on the basis of the resonance frequencies.

20 Claims, 8 Drawing Sheets

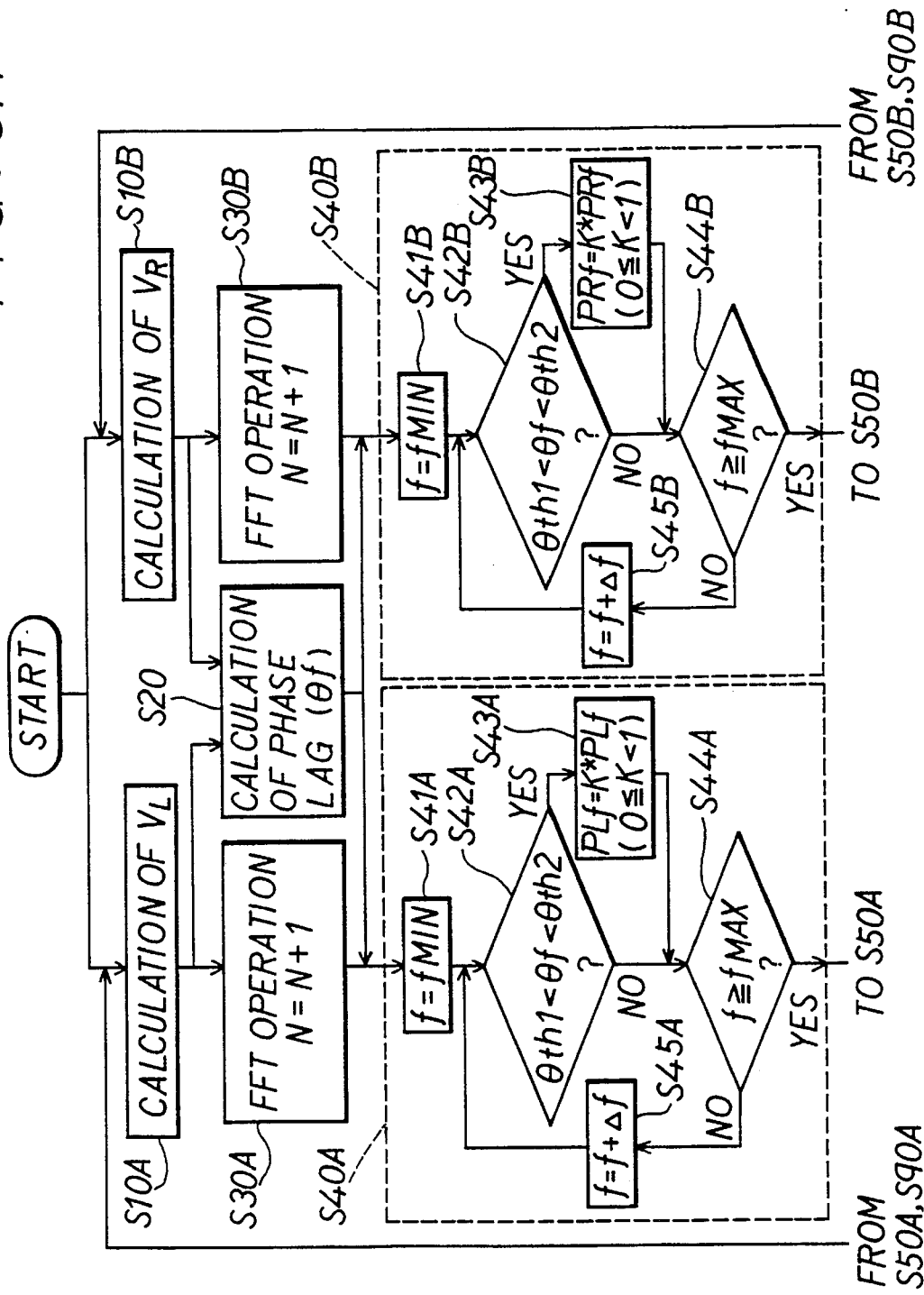

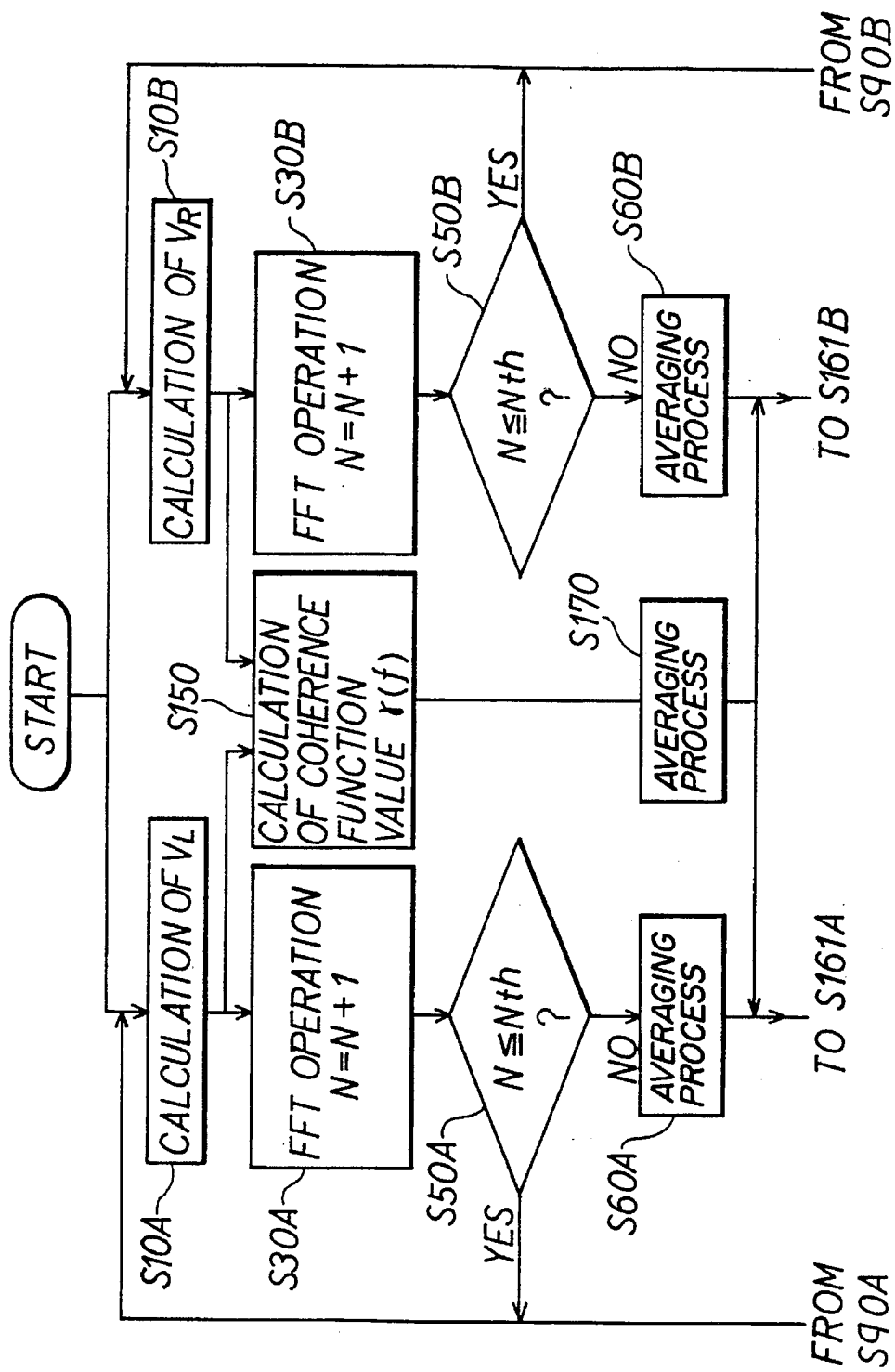

TIRE RESONANCE FREQUENCY DETECTING SYSTEM HAVING INTER-WHEEL NOISE ELIMINATION AND METHOD FOR THE SAME

CROSS REFERENCE TO RELATED APPLICATION

This application is based upon and claims priority from Japanese Patent Application No. Hei. 6-183430 filed Aug. 4, 1994, the contents of which are incorporated herein by reference.

BACKGROUND OF THE INVENTION

1. Field of the Invention:

The present invention relates to a tire resonance frequency detecting apparatus which detects a tire resonance frequency from a tire vibration frequency component, and particularly relates to a tire resonance frequency detecting apparatus which can precisely detect a tire resonance frequency by specifying and reducing noise frequency components from the tire vibration frequency component.

The tire resonance frequency detected by the tire resonance frequency detecting apparatus according to the present invention can be used for a tire air pressure detecting apparatus which detects a tire air pressure on the basis of a tire resonance frequency.

2. Description of the Related Art:

In a conventional tire resonance frequency detecting apparatus, a tire resonance frequency is detected from a tire vibration frequency component which is extracted from a vehicle wheel speed signal which is generated by a wheel speed sensor or the like during vehicle traveling, and is used for a tire air pressure detection.

An example of the conventional apparatus is disclosed in Japanese Patent Application Laid-Open No. Hei. 5-133831. In this conventional tire air pressure detection apparatus, the tire vibration frequency is derived by performing a fast Fourier transform (FFT) operation with respect to the wheel speed signal. Thereafter, a noise component therein is reduced by performing an averaging process and a moving averaging process with respect to the tire vibration frequency. After that, the tire resonance frequency is calculated based on the noise-reduced tire vibration frequency.

Besides the above method, as a method of reducing the noise frequency component included in the tire vibration frequency component, a method of using a low pass filter or the like is well known.

The tire vibration frequency component, however, includes not only the resonance frequency caused by the tire air pressure but also other resonance frequencies such as a noise frequency. For example, in a tire which corresponds to a drive-wheel, a vibration thereof includes vibrations caused by a slight eccentricity of a gear in a power transmission system and unevenness of gear teeth and these become the noise frequency component.

If such a noise frequency component is included in the tire vibration frequency component, the noise frequency component may be detected as the tire resonance frequency unless it is distinguished from the tire resonance frequency. That is, there arises the possibility that a detection error of the tire resonance frequency becomes larger. Furthermore, when the tire air pressure detecting apparatus uses the tire resonance frequency including the noise frequency component to detect a tire air pressure, detection precision of the tire air pressure also deteriorates and thereby the tire air pressure detecting apparatus may warn of a fall of the tire air pressure erroneously.

To solve the above problem, the conventional apparatus merely performs the averaging process and the moving averaging process with respect to the tire vibration frequency component to reduce the noise frequency component. The above processes, however, just smooths the noise frequency component to some degree, and further a level of the true tire resonance frequency component also declines due to the averaging process and the like.

In addition, when a noise reduction process is executed by a band pass filter or the like, which the tire vibration frequency is passed through, the filter unnecessarily removes a resonance frequency which is included within the frequency band, as well as the noise frequency component.

To summarize,, because the noise frequency component included in the tire vibration frequency component cannot be specified in the noise reduction process such as the averaging process and the like, the noise reduction process which is effective to reduce the noise frequency component cannot be performed. Therefore, the detection error of the tire resonance frequency becomes larger and deteriorates the detection accuracy of the tire air pressure.

SUMMARY OF THE INVENTION

In view of the above problems of the prior art, it is an object of the present invention to provide a tire resonance frequency detecting apparatus which can specify a noise frequency component other than a resonance frequency component caused by a tire air pressure and precisely detect a tire resonance frequency by suppressing the noise frequency component as much as possible. If the tire resonance frequency detected thus is supplied to a tire air pressure detecting apparatus and used for a detection of a tire air pressure, it is possible to provide a tire air pressure detecting apparatus which can precisely detect the tire air pressure.

A tire resonance frequency detecting apparatus according to the present invention specifies and detects a noise frequency component other than a resonance frequency component caused by a tire air pressure on the basis of a correlation between left-hand and right-hand tire vibration frequency components. The noise frequency component is caused by a slight eccentricity of a gear in a power transmission system, vibration of the gear and the like as explained later in detail. The noise frequency component is respectively included in the left-hand and the right-hand tire vibration frequency components and these have a predetermined correlation. That is, when the noise frequency component is transmitted from, for example, a differential gear device, the noise frequency component reaches the left-hand tire and right-hand tire at the same time. On the other hand, the resonance frequency component caused by the tire air pressure is produced in response to a resonance phenomenon when the tire is twisted due to conditions of a road surface. Because the road surface inevitably has minute unevenness, the tire is caused to randomly vibrate owing to the minute unevenness, and amplitude and frequency of the vibration is different from tire to tire. Accordingly, it is possible to detect the noise frequency component by referring to the correlation between left-hand and right-hand tire vibration frequency components.

At this time, it can be determined whether the vibration frequency component is the noise frequency component by determining whether the correlation between left-hand and right-hand tire vibration frequency components has a specified inherent value on the basis of a statistical analysis of each tire vibration frequency component.

Furthermore, as described above, the vibration frequency component caused by the tire air pressure is different from tire to tire and the noise frequency component which is not caused by the tire air pressure but caused by a power transmission system of the like reaches the left-hand and right-hand tires with a predetermined correlation. To determine whether they have the predetermined correlation, a phase lag of each vibration frequency component can be utilized, and a coherence function thereof can also be utilized.

Moreover, assuming that the noise frequency component from the power transmission system or the like reaches each tire at the same time, among the vibration frequency components, a frequency component having the identical phase can be determined as the noise frequency component to perform a noise reduction process. Furthermore, a predetermined range can be established with respect to the phase lag. That is, as a result of comparing each vibration frequency component, if the phase lag therebetween is within the predetermined range, the vibration frequency components can be determined as the noise frequency component. Due to this, if the noise frequency component from the power transmission system does not completely reach the left-hand tire and the right-hand tire at the same time because of a turning state of a vehicle or the like, the noise frequency component can be detected precisely.

The tire vibration frequency components are obtained by performing a fast Fourier transform (FFT) with respect to wheel speed signals from wheel speed sensors installed for each wheel. Through the performance of the FFT operation, power spectrums and phases of each vibration frequency component can become clear. In this case, it is possible to reduce the noise frequency component by making the power spectrum thereof smaller and thereby suppress an influence of the noise frequency component against the true tire resonance frequency component. It is also possible to reduce the noise frequency component by deleting the power spectrum of the frequency-component determined to be the noise frequency component. In this case, the tire resonance frequency is not subject to the noise frequency component at all.

When the tire resonance frequency obtained as described above is used for a tire air pressure detecting apparatus which detects a tire air pressure on the basis of a tire resonance frequency, it can perform a precise tire air pressure detection.

Furthermore, because the tire resonance frequency has a predetermined relationship with a tire spring constant, it is possible to derive the tire spring constant instead of the tire resonance frequency to detect the tire air pressure and apply it for the tire air pressure detecting apparatus.

BRIEF DESCRIPTION OF THE DRAWINGS

Other features and advantages of the present invention will be appreciated, as well as methods of operation and the function of the related parts, from a study of the following detailed description,, the appended claims, and the drawings, all of which form a part of this application. In the drawings:

FIG. 3A is a flow chart showing processing which the ECU of FIG. 1 performs;

FIG. 7A is a flow chart showing processing which the ECU in the third embodiment performs;

DETAILED DESCRIPTION OF THE PREFERRED EMBODIMENTS

The first embodiment of the present invention will be explained hereinafter with reference to the drawings.

Figure 1:
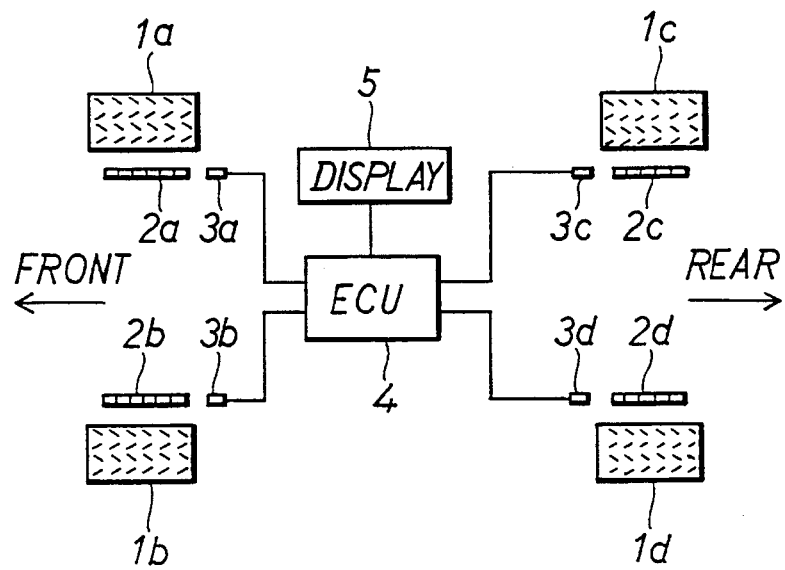
FIG. 1 is a structural diagram showing a whole structure of a tire air pressure detecting apparatus according to the first embodiment of the present invention.

FIG. 1 is a structural view showing the whole structure of the first embodiment in which a tire resonance frequency detecting apparatus according to the present invention is applied to a tire air pressure detecting apparatus.

As shown in FIG. 1, wheel speed sensors are provided for respective tires $1a$ through $1d$ of a vehicle. Each wheel speed sensor comprises gears $2a$ through $2d$ and pick-up coils $3a$ through $3d$. The gears $2a$ through $2d$ are coaxially mounted on a rotary shaft (not shown) of each tire $1a$ through $1d$, and are made from disc-shaped magnetic bodies. The pick-up coils $3a$ through $3d$ are positioned in close proximity to the gears $2a$ through $2d$ with a predetermined gap therebetween for outputting an alternating current signal which has a period corresponding to the rotational speed of the gears $2a$ through $2d$, i.e., the tires $1a$ through $1d$. The alternating current signals output from the pick-up coils $3a$ through $3d$ are applied to an electronic control unit (ECU) 4 comprising a wave shaping circuit, ROM (read only memory), RAM (random access memory) and so on so that a predetermined signal processing, which includes a wave shaping, is performed. The result of this signal processing is applied to a display portion 5 which indicates an air pressure condition of each tire $1a$ through $1d$ to a driver. The display portion 5 may display the air pressure condition of each tire $1a$ through $1d$ independently, or by providing only one alarm lamp, it may provide an alarm by turning on the alarm lamp when the air pressure of any one of the tires $1a$ through $1d$ is below a reference air pressure.

Figure 2:
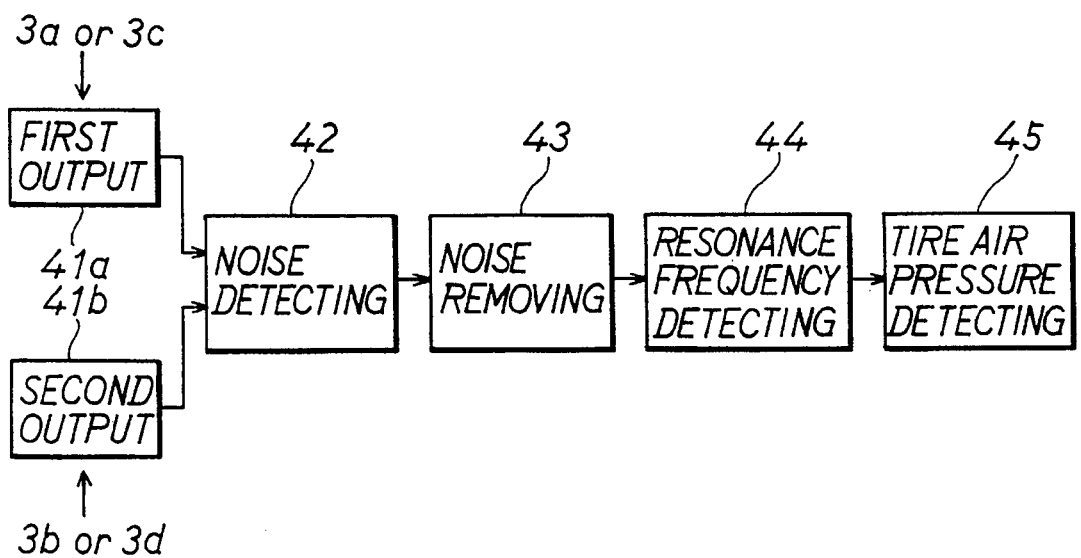
FIG. 2 is a block diagram showing a function of an ECU of FIG. 1.

FIG. 2 is a block diagram showing a function of the ECU 4. As shown in FIG. 2, the ECU 4 comprises first output means $41a$ and second output means $41b$ for respectively outputting tire vibration frequency components of left-hand and right-hand tires while the vehicle is traveling, noise detecting means 42 for detecting a noise frequency component which is independent of the tire air pressure on the basis of a correlation between the vibration frequency components respectively generated by the first output means $41a$ and second output means $41b$, noise reducing means 43 for reducing the noise frequency component detected by the noise detecting means 42 from the vibration frequency component, tire resonance frequency detecting means 44 for detecting resonance frequencies of each tire by using the vibration frequency component from which the noise frequency component is reduced, and tire air pressure detecting means 45 for detecting tire air pressures on the basis of the resonance frequencies detected by the tire resonance frequency detecting means 44.

Details of operation of the noise reducing means 43 will be explained hereinafter.

When the vehicle is traveling on, for example, a paved road, a gravel road, or a road on a bridge built in a high position, the tires vibrate due to minute unevenness of a road surface or objects such as stones. Accordingly, a twist resonance phenomenon occurs in each tire by a tire vibrating in accordance with road surface condition. The twist resonance phenomenon means a phenomenon where a side portion of the tire is twisted by fine deviation of rotation angle between a central portion of the tire and a peripheral portion of the tire, and the twist thereof is repeated at a certain frequency. The tire vibration in accordance with the road surface condition is a vibration which has different amplitudes and frequencies for each tire, and irregularly occurs in accordance with the road surface condition. Therefore, most of the vibration frequency component due to the twist resonance phenomenon is not equal for the left-hand tire and the right-hand tire in frequency or the like. That is because there is almost no possibility that the left-hand tire and the right-hand tire simultaneously travel on the road with surface condition which causes the same vibration frequency component to occur, and thereby the vibration frequency components due to the each tire's twist resonance phenomenon hardly have a specified time lag.

Accordingly, when the correlation of the tire vibration frequency between the left-hand tire and the right-hand tire becomes a specified inherent value according to the statistics, i.e., the tire vibration frequency components of the left-hand tire and the right-hand tire do not occur irregularly, the noise detecting means 42 determines it as a resonance vibration other than a tire resonance vibration, i.e., the noise frequency component. That is, the tire resonance through a differential gear device or by a backward and forward spring portion of a suspension is transmitted to the left-hand tire and the right-hand tire with a predetermined correlation. Therefore, the vibration frequency component can be specified as the noise frequency component by detecting the frequency components having the predetermined correlation among the vibration frequency component of the left-hand tire and right-hand tire. To sum up, the noise frequency component is transmitted to the left-hand tire and right-hand tire with a predetermined phase lag or the same phase, differing from the tire vibration frequency which is irregularly caused in accordance with the road surface condition, and thereby the ECU 4 in the first embodiment specifies the noise frequency component based on a phase relationship.

Figure 3B:
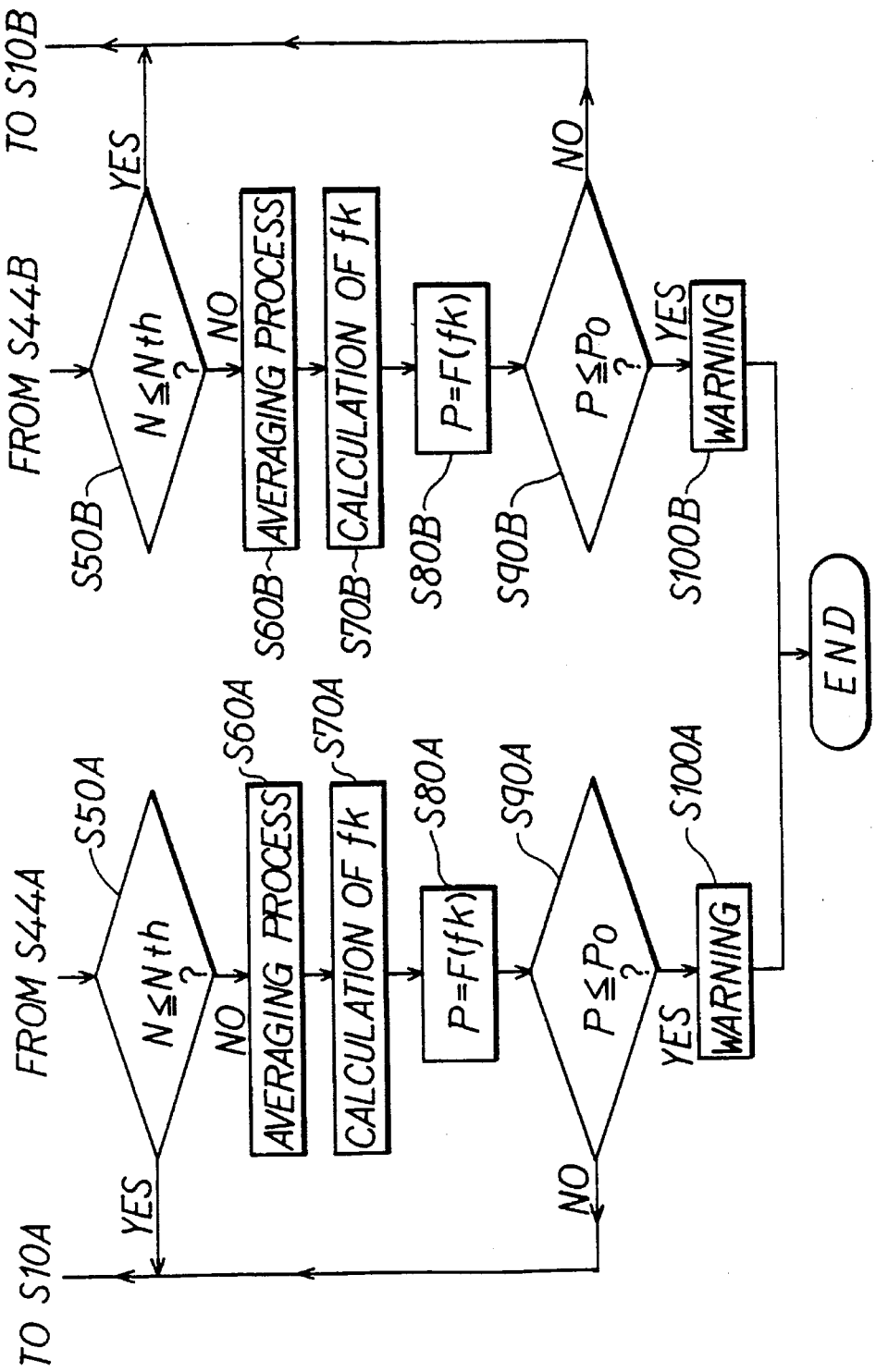
FIG. 3B is a flow chart showing processing which the ECU of FIG. 1 performs.

FIGS. 3A and 3B are flow charts showing processing which the ECU 4 in the first embodiment performs. In FIGS. 3A and 3B, only processing for two rear tires 1c and 1d is shown, because the ECU 4 performs the same processing for front tires 1a and 1b as for the rear tires 1c and 1d.

In FIG. 3A, at steps S10A and S10B, after a pulse signal is formed by wave-shaping the alternating current signal output from the pick-up coils 3c and 3d, wheel speeds VL and VR are calculated by dividing the pulse interval with an elapsed period. At step S20, a phase delay (hereinafter, "phase lag") $\theta f$ with respect to each frequency f is derived by calculating a frequency response function, an input of which is either of the wheel speeds VL and VR, and an output of which is the other. At steps S30A and S30B, a frequency analysis is performed with respect to the calculated wheel speeds. In the first embodiment, an FFT operation is performed to obtain a power spectrum (PLf, PRf) with respect to each frequency f, and the cycles of the operation are counted (N=N+1).

At steps S40A and S40B, the noise frequency components are detected, and the noise reduction processes are performed. Because these processes for the left-hand tire and the right-hand tire are the same, the process in step S40A only will be explained.

At step S41A, a lower limit value of the frequency f to perform the noise reduction process is set to fMIN as described below.

lower limit value of the frequency f=fMIN

At step S42A, the determination whether the phase lag $\theta f$ at the above frequency f has the following relationship with a predetermined threshold values $\theta th1$, $\theta th2$ is performed.

$$\theta th1 \leq \theta f \leq \theta th2$$

When the phase lag $\theta f$ is within a range from $\theta th1$ to $\theta th2$, it is determined that the power spectrum PLf at this frequency f includes lots of the noise frequency components. Thereafter, the processing progresses to step S43A. On the other hand, when the phase lag $\theta f$ is out of the range from $\theta th1$ to $\theta th2$, the processing progresses to step S44A as the value of the power spectrum PLf does not change from the value in step S30A.

At step S43A, the power spectrum PLf is renewed by multiplying the power spectrum PLf at the frequency f by a predetermined compensatory coefficient K ($0 \leq K < 1$). At step S44A, it is determined whether the frequency f is larger than an upper limit value fMAX ($f \geq fMAX$) which specifies an upper limit frequency to perform the noise reduction process. When the frequency f<the upper limit value fMAX, the processing progresses to step S45A, but when the frequency $f \geq$ the upper limit value fMAX, the processing progresses to step S50A.

At step S45A, the frequency f is increased by adding a minimum resolving frequency $\Delta f$ of the FFT operation ($f=f+\Delta f$), and thereafter the processing returns to step S42A. The above processes are repeated to perform the noise reduction process until the frequency f is the upper limit value fMAX or more.

At step S50A, it is determined whether the number N of the FFT operations reaches a predetermined number Nth ($N \leq Nth$) to add and average a result of a plurality of the FFT operations where the noise reduction process has been performed. When $N \leq Nth$, the processes from step 10A to step S40A are further repeatedly performed. When N>Nth, the processing progresses to step S60A.

At step S60A, an averaging process is performed. In the averaging process, the power spectrums obtained from each FFT operation are added and averaged at each frequency. The power spectrum Pf where the averaging process is performed at frequency f can be calculated by the following equation, where the PfN is defined as a power spectrum of frequency f at the time of N time's FFT operation.

$$Pf = \sum_{N=1}^{Nth} PfN/Nth$$

At step 70A, a tire air pressure P is derived from a relationship between the tire resonance frequency fk and the tire air pressure P (P=F(fk)). At step 90A, it is determined whether the tire air pressure P is less than an allowable lower limit value P0 of the tire air pressure (P≤P0). When P≤P0, the processing progresses to step 100A, but when P>P0, the processing progresses to step S10A. At step 100A, the display portion 5 displays an unallowable fall condition of the tire air pressure to give a warning to a driver.

Figure 4:
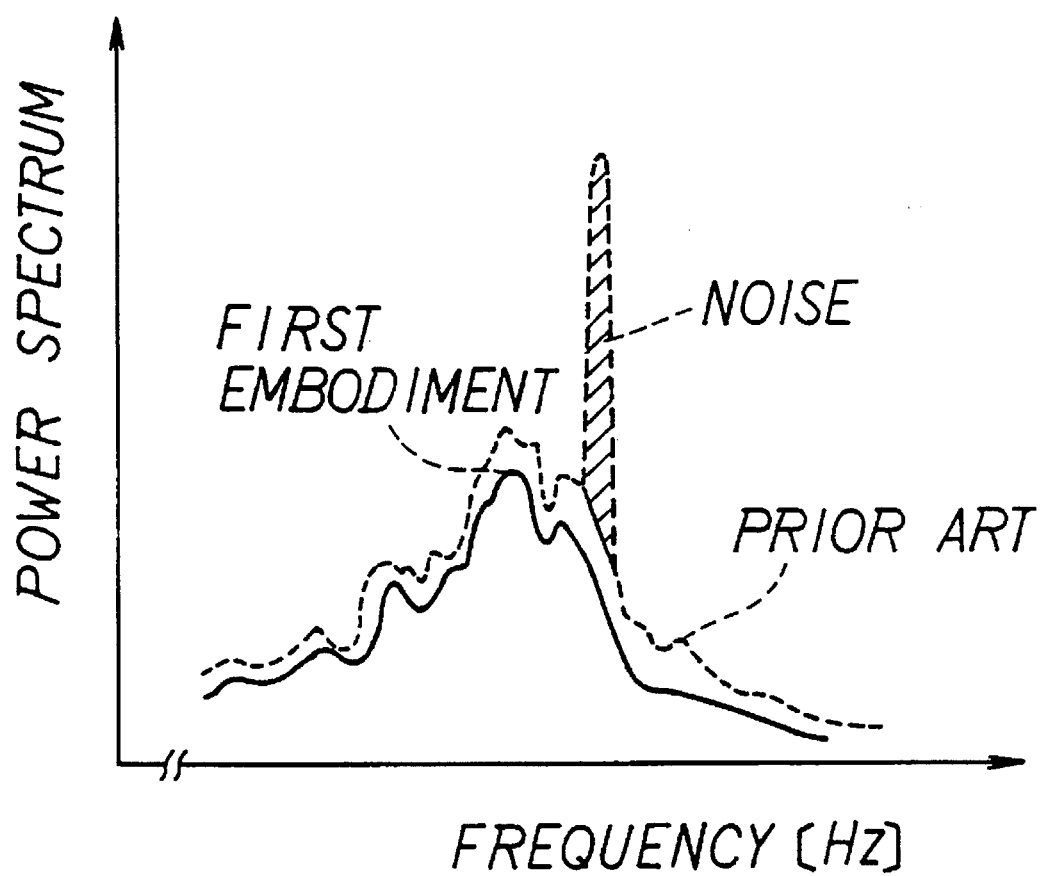
FIG. 4 is a graph showing an effect in a case where the first embodiment is applied to a vehicle which is driven by rear wheels.

FIG. 4 is a graph showing an effect in a case where the first embodiment is applied to a vehicle which is driven by rear wheels. Vibration which is proportional to drive shaft revolutions and which is caused by an eccentricity of the gear in the power transmission system is generated in the drive-wheel. The vibration is transmitted to the left-hand tire and the right-hand tire at the same time via a drive shaft and causes fluctuation in wheel speeds. The fluctuation and as a result, the noise frequency component is included in the vibration frequency component as shown in FIG. 4.

It is, however, possible to reduce the noise frequency component with the noise reduction process composed of step S40A and step S40B as shown with a solid line in FIG. 4.

In the first embodiment, one frequency range from fMIN to fMAX is established, however, more than two frequency ranges can be established and threshold values θth1 and θth2 to determine the magnitude of the phase lag can be set in accordance with the frequency ranges.

Furthermore, in the first embodiment, the noise frequency component is reduced by compensating the power spectrum at steps S43A, S44A, and S45A and so on. In this case, the influence of the noise frequency component on the detection of the tire air pressure can be reduced by making lower the level of the power spectrum, or specified noise frequency components can be entirely cut off by setting the level of the power spectrum to zero.

Moreover, in the first embodiment, some extent of determination range is established by the threshold values θth1 and θth2 to detect the phase lag of the vibration frequency components transmitted to each tire and thereby to specify the noise frequency component. However, the threshold values θth1 and θth2 may be set to zero. In this case, only the same phase component is strictly detected as the noise frequency component. If the threshold values θth1 and θth2 are set to zero, the noise frequency component which is transmitted to the left-hand tire and the right-hand tire at the same time from the drive system such as the differential gear device can be sufficiently specified, and there is little possibility that the vibration frequency component including the true tire resonance frequency is detected erroneously as the noise frequency component.

Explained next is the second embodiment, which is characterized by estimating tire spring constants on the basis of frequency components after the noise reduction processes according to steps S40A, S40B of the first embodiment and detecting a tire air pressure from the tire spring constants.

The noise reducing process of the second embodiment equals to that of the first embodiment, and so the explanation thereof is omitted. Hereinafter, an operation method of estimating the tire spring constant will be explained in detail.

Figure 5:
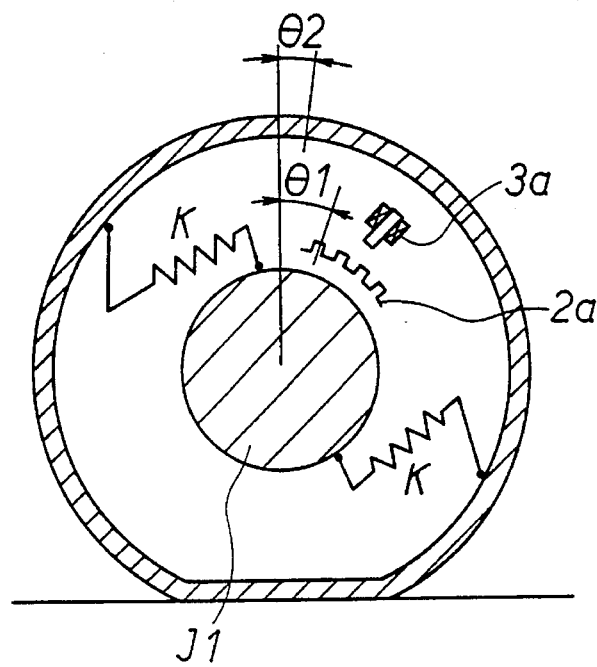
FIG. 5 is a schematic view showing a tire model.

FIG. 5 is a schematic view showing a tire model. As shown in FIG. 5, an equation of motion with respect to a tire twist vibration is expressed with the following equations:

$$J1 \times (d\omega 1/dt) = -k \times (\theta 1 - \theta 2)$$

$$\omega 1 = d\theta 1/dt$$

wherein ω1 is the wheel speed (angular speed) which is calculated on the basis of a signal detected by the pick-up coils 3a through 3d of FIG. 1, θ1 is an angle thereof, J1 is a moment of inertia of a rotating weight portion (wheel, acceleration shaft and so on) under a spring of a suspension, k is a twist spring constant of the tire, and θ2 is a twist angle of a rubber portion at the side of the tire.

In the above equation, because θ2 can be regarded as almost zero (θ2≈0), the twist spring constant of the tire can be calculated by the following equation:

$$k = -J1 \times (d\omega 1/dt)/\theta 1 \;\; 1 - J1 \times (d\omega 1/dt)/(\int \omega 1 dt)$$

ω1 can be detected by the pick-up coil, and J1 is a value determined by a specification of a vehicle as described before. Therefore, the twist spring constant can be calculated by the above equation. That is, in the second embodiment, ω1 is calculated from the vibration frequency component after performing the noise reduction process at steps S40A and S40B in FIG. 3A, instead of the calculation of the resonance frequency fK at steps S70A and S70B in FIG. 3B to derive the twist spring constant k. The tire air pressure P is calculated by a known method with using the twist spring constant k, instead of the process at step S80A and S80B.

The twist spring constant may be indirectly derived from the tire resonance frequency of the first embodiment. That is, the resonance frequency f is generally represented by the following equation.

$$f \propto (k/m)^{1/2}$$

Because m is a constant value determined by a specification of a vehicle, the twist spring constant k can be derived from the above equation.

Figure 6:
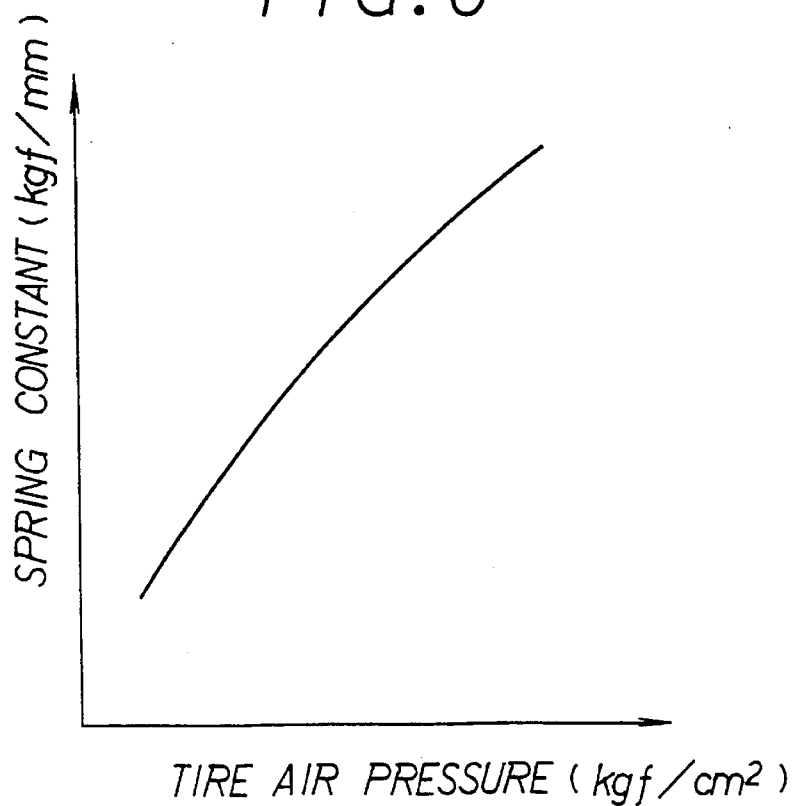
FIG. 6 is a graph showing a relationship between an average value K of twist spring constants and a tire air pressure in the second embodiment.
Figure 7C:
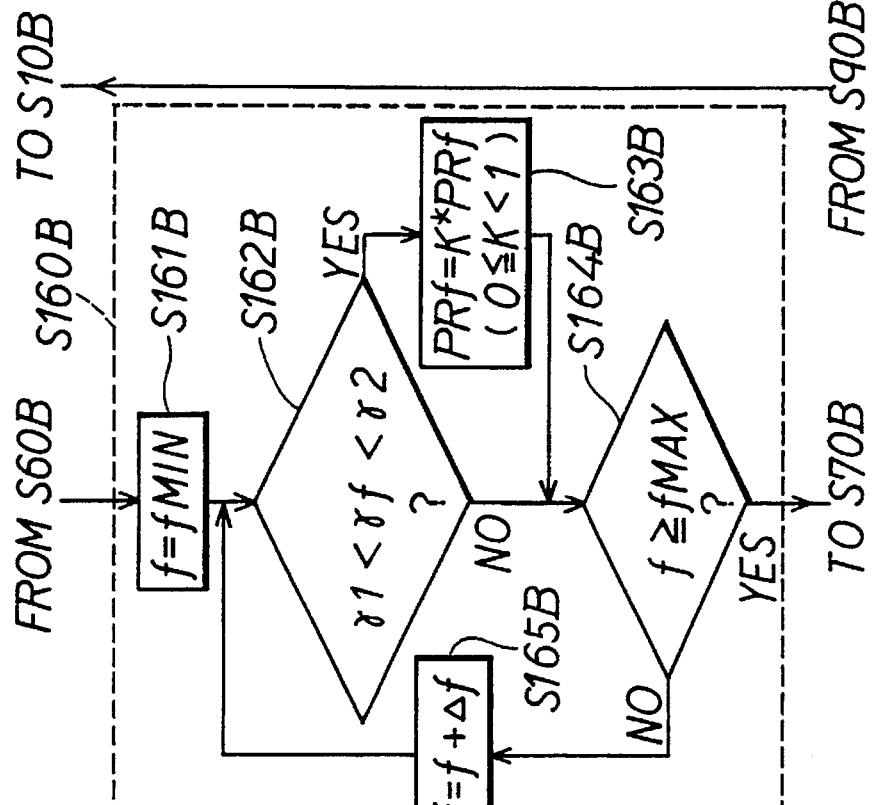
FIG. 7C is a flow chart showing processing which the ECU in the third embodiment performs.
Figure 7B:
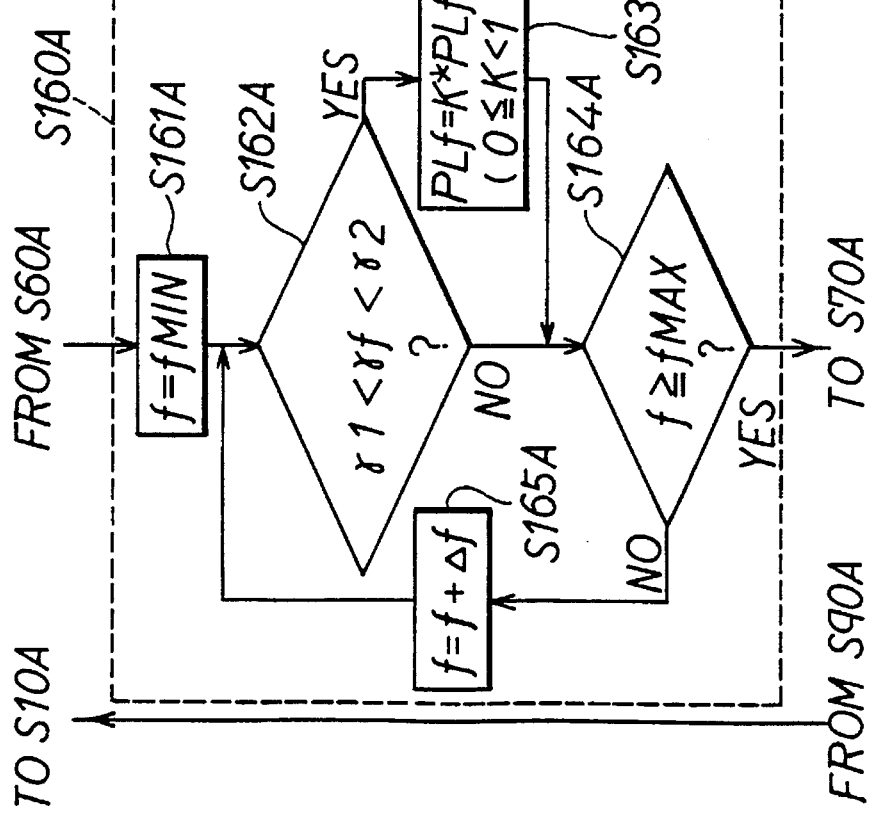
FIG. 7B is a flow chart showing processing which the ECU in the third embodiment performs.
Figure 7D:
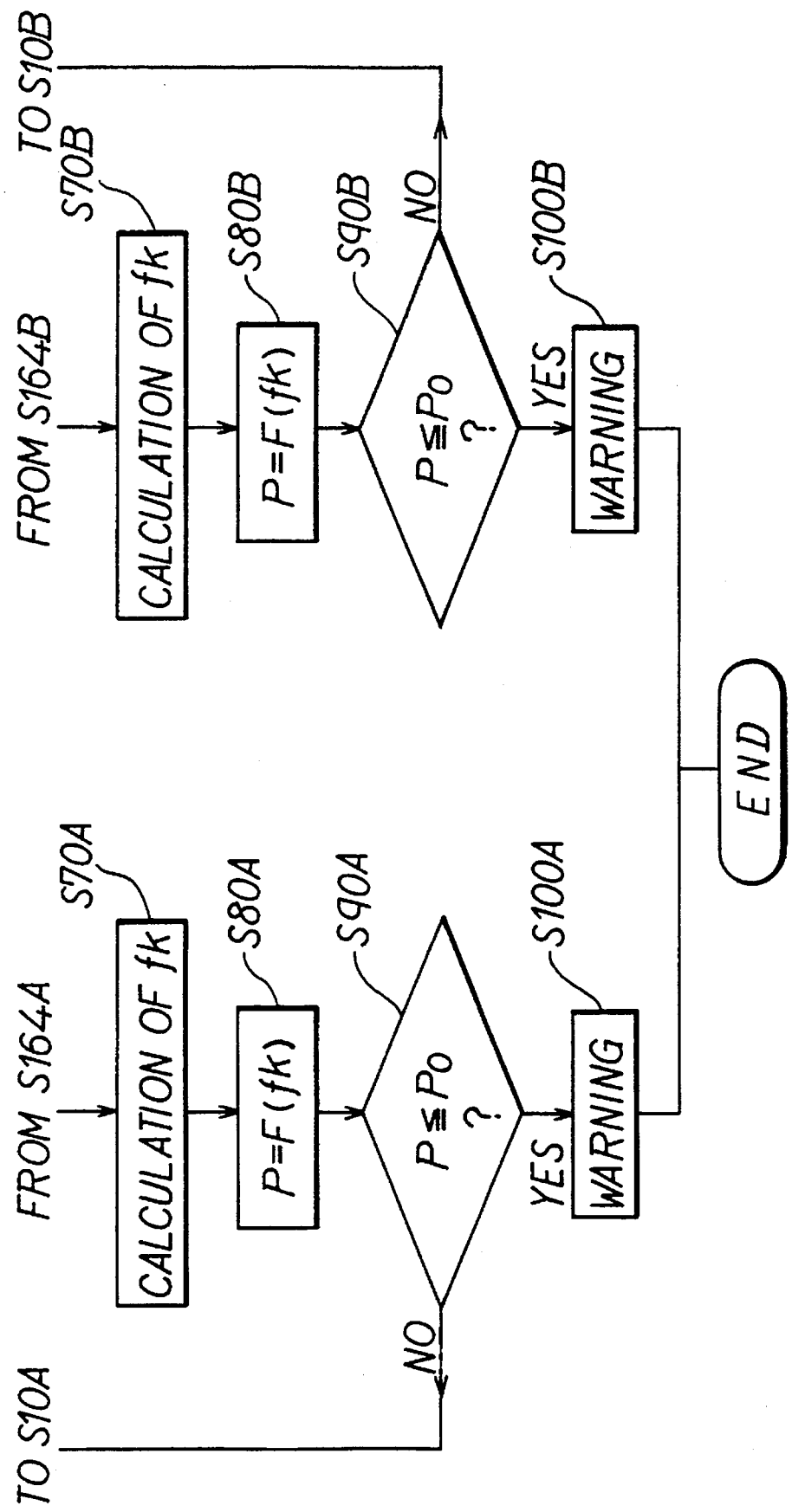
FIG. 7D is a flow chart showing processing which the ECU in the third embodiment performs.

FIG. 6 is a graph showing a relationship between an average value K of the twist spring constants and a tire air pressure. The relationship shown in FIG. 6 may be stored as a map. In this case, after the average value K is calculated, the tire air pressure can be directly detected by referring to the map. Furthermore, when the map is utilized, a display form of the display portion 5 may be changed so that the tire air pressure which is estimated by referring to the map is directly displayed thereon for each tire.

Next, the third embodiment will be explained. In the third embodiment, a coherence function which is known as a method of a frequency analysis is used as a value showing the correlation between the vibration frequency components of the left-hand tire and the right-hand tire. A noise determination and a noise reduction are performed on the basis of a value of the coherence function.

FIGS. 7A, 7B, 7C and 7D are flow charts showing processing which the ECU 4 in the third embodiment performs.

After wheel speeds of the left-hand tire and right-hand tire are calculated at steps S10A and S10B, the coherence function is calculated from the wheel speeds at step S150. Thereafter, FFT operations are performed at steps S30A and S30B and whether the number of the FFT operations reaches a predetermined number is determined at steps S50A and S50B, and the above steps are repeatedly executed until the number thereof equals to Nth. At steps S60A and S60B, a process to average the result of the FFT operations is performed.

At step S170, an averaging process is performed with respect to a calculation result of the coherence function as well. In the averaging process, coherence function values γ(f) at each frequency in place of the power spectrum at step S60A and S60B are added and averaged. The processes of step S160A and the subsequent steps will be explained only about the process for the left-hand tire.

At step S161A, a lower limit value of the frequency f to perform the noise reduction process is set to fMIN as described below.

$$f = fMIN$$

At step S162A, whether the coherence function value γ(f) after the averaging process has the following relationship with a predetermined threshold values γ1 and γ2 is determined.

$$\gamma 1 \leq \gamma(f) \leq \gamma 2$$

When the coherence function value γ(f) is within a range from γ1 to γ2, it is determined that there are lots of noise frequency components at this frequency f. Thereafter, the processing progresses to step S163A. At step S163A, the power spectrum PLf is renewed by multiplying the power spectrum PLf at the frequency f after the averaging process by a predetermined compensatory coefficient K ($0 \leq K \leq 1$). On the other hand, when the coherence function value γ(f) is out of the range from γ1 to γ2, the processing progresses to step S164A as the value of the power spectrum PLf does not change from the value in step S60A.

Step S164A and step S44A in FIG. 3A are the same and step S165A and step S45A are also the same, and the above processes are repeatedly executed to perform the noise reduction until the frequency f becomes the upper limit value fMAX. Further, the explanation of step S70A and the subsequent steps is omitted because they are the same as the processes of the first embodiment.

In the above embodiments, the wheel speed sensor composed of the pick-up coil is exemplified as output means for outputting signal including the vibration component of an unsprung weight. However, as the output means, an acceleration sensor installed on an unsprung portion (for example, a lower arm), a displacement sensor installed so that a relative displacement between the vehicle body and the tire can be detected, or a load sensor installed so that a load between the vehicle body and the tire can be detected, can be applied.

As many apparently widely different embodiments of this invention may be made without departing from the spirit and scope thereof, it is to be understood that the invention is not limited to the specific embodiments thereof except as defined in the appended claims.

What is claimed is:

1. A tire resonance frequency detecting apparatus for a vehicle having a left-hand tire and a right-hand tire, said apparatus comprising:

first output means for outputting a vibration frequency component of said left-hand tire during vehicle travelling;

second output means for outputting a vibration frequency component of said right-hand tire during vehicle travelling;

noise detecting means for detecting a noise frequency component, other than a resonance frequency caused by a tire air pressure, from said vibration frequency components of said left-hand tire and said right-hand tire based on a correlation between said vibration frequency components of each tire output by said first output means and said second output means;

noise removing means for removing said noise frequency component detected by said noise detecting means from the vibration frequency components of each tire; and tire resonance frequency detecting means for detecting a tire resonance frequency from said vibration frequency component of each tire from which said noise frequency component is removed by said noise removing means.

2. A tire resonance frequency detecting apparatus for a vehicle according to claim 1, wherein said noise detecting means is for determining said each vibration frequency component as said noise frequency component when said correlation between said vibration frequency components output by said first output means and said second output means statistically has a specified inherent value.

3. A tire resonance frequency detecting apparatus for a vehicle according to claim 2, wherein said noise detecting means is for determining said correlation using a phase lag between said vibration frequency components output by said first output means and said vibration frequency component output by said second output means at each frequency.

4. A tire resonance frequency detecting apparatus for a vehicle according to claim 3, wherein said noise detecting means is for detecting each vibration frequency component as said noise frequency component when said phase lag between said vibration frequency components output by said first output means and said second output means is within a predetermined range.

5. A tire resonance frequency detecting apparatus for a vehicle according to claim 3, wherein said noise detecting means detects each vibration frequency component as said noise frequency component when each vibration frequency component output by said first output means and said second output means has the same phase.

6. A tire resonance frequency detecting apparatus for a vehicle according to claim 2, wherein said noise detecting means is for determining said correlation using coherence functions on said vibration frequency components corresponding to said left-hand tire and said right-hand tire which include a tire vibration component at each frequency.

7. A tire resonance frequency detecting apparatus for a vehicle according to claim 1, wherein said noise removing means is for suppressing an influence of said noise frequency component by compensating a power spectrum of said noise frequency component at each frequency.

8. A tire resonance frequency detecting apparatus for a vehicle according to claim 1, wherein said first output means and said second output means respectively output said vibration frequency component corresponding to each tire by performing a fast Fourier transform operation with respect to wheel speed signals from wheel speed sensors installed for each tire.

9. A tire resonance frequency detecting apparatus for a vehicle according to claim 1, wherein said noise removing means is for removing said noise frequency component by deleting a power spectrum of said noise frequency component at each frequency.

10. A tire resonance frequency detecting apparatus for a vehicle according to claim 1, said apparatus further comprising:

tire air pressure detecting means for detecting air pressures of each tire based on said tire resonance frequency components derived from said vibration frequency components of each tire from which said noise frequency component is removed by said noise removing means.

11. A tire resonance frequency detecting apparatus for a vehicle according to claim 1, said apparatus further comprising:

tire air pressure detecting means for detecting air pressures of each tire based on tire spring constants which correspond to said tire resonance frequency and are detected from said vibration frequency components of each tire from which said noise frequency component is removed by said noise removing means.

12. A tire resonance frequency detecting apparatus for a vehicle according to claim 1, wherein said noise detecting means detects said noise frequency component based on a phase correlation between said vibration frequency components of each tire output by said first output means and said second output means.

13. A tire resonance frequency detecting apparatus for a vehicle according to claim 1, wherein said noise detecting means detects said noise frequency component based on occurrence in time of said vibration frequency components of each tire output by said first output means and said second output means.

14. A method of detecting resonance frequencies of vehicle tires, said method comprising the steps of:

generating a first vibration signal representative of vibration frequency components of a first wheel;

generating a second vibration signal representative of vibration frequency components of a second wheel;

correlating vibration frequency components in said first vibration signal with vibration frequency components in said second signal;

removing noise frequency components from at least one of said first vibration signal and said second vibration signal responsive to said vibration frequency component correlation step to produce at least one noise-removed vibration signal; and detecting a resonance frequency of said at least one tire based on said at least one noise-removed vibration signal.

15. The method of claim 14, said vibration frequency component correlating step comprising a step of calculating a phase lag between corresponding vibration frequency components in said first vibration signal and said second vibration signal.

16. The method of claim 14, said phase lag calculating step comprising a step of determining whether said phase lag is within a predetermined range.

17. The method of claim 14, said phase lag calculating step comprising a step of determining whether said phase lag is zero.

18. The method of claim 14, wherein:

said first vibration signal generating step is a step of generating a first vibration signal representative of vibration frequency components of a first wheel on a first side of a vehicle; and said second vibration signal generating step is a step of generating a second vibration signal representative of vibration frequency components of a second wheel on a second side of said vehicle different from said first side.

19. The method of claim 14, said noise frequency removing step comprising a step of compensating a power spectrum of said at least one of said first and second vibration signals responsive to said vibration frequency component correlation step.

20. The method of claim 14, said noise frequency removing step comprising a step of eliminating a portion of a power spectrum of said at least one of said first and second vibration signals corresponding to said noise frequency components responsive to said vibration frequency component correlation step.

* * * * *

UNITED STATES PATENT AND TRADEMARK OFFICE
CERTIFICATE OF CORRECTION

PATENT NO.      : 5,596,141

DATED           : January 21, 1997

INVENTOR(S)     : NISHIKAWA et al.

It is certified that error appears in the above-identified patent and that said Letters Patent is hereby corrected as shown below:

Title page,

In Item [73], kindly add the second Assignee

--NIPPON SOKEN, INC., NISHIO-CITY, JAPAN--.

Signed and Sealed this

Twenty-sixth Day of August, 1997

Attest:

BRUCE LEHMAN

*Attesting Officer*     *Commissioner of Patents and Trademarks*